March 12, 1957 E. T. JACKSON Re. 24,285

ADJUSTABLE DOOR CASING

Original Filed April 29, 1952 2 Sheets-Sheet 1

Inventor
Edwin T. Jackson,
by George H. Baldwin
His Attorney.

March 12, 1957 E. T. JACKSON Re. 24,285

ADJUSTABLE DOOR CASING

Original Filed April 29, 1952 2 Sheets-Sheet 2

Inventor
Edwin T. Jackson,
by George H. Baldwin
His Attorney.

United States Patent Office

Re. 24,285
Reissued Mar. 12, 1957

24,285

ADJUSTABLE DOOR CASING

Edwin T. Jackson, Tallahassee, Fla., assignor to Jackstite, Inc., Tallahassee, Fla., a corporation of Florida Original No. 2,706,837, dated April 26, 1955, Serial No. 284,897, April 29, 1952. Application for reissue October 8, 1956, Serial No. 614,772

18 Claims. (Cl. 20—11)

Matter enclosed in heavy brackets [ ] appears in the original patent but forms no part of this reissue specification; matter printed in italics indicates the additions made by reissue.

This invention pertains to casings or finish frames positionable in building wall openings, such as door and window openings. More particularly, the invention relates to a casing adapted for fastening into a rough doop opening of the interior wall of a building.

A general object of this invention is to provide an improved adjustable casing for a building wall opening.

The casings contemplated by this invention are primarily intended for substantially complete pre-assembly at a factory or mill and subsequent delivery to the building site for rapid erection in the rough wall openings.

The walls of modern houses are of many different thicknesses since a great many houses are now finished with wall coverings other than standard ¾ inch plaster. Such other coverings include, for example, ¼ inch plywood or paneling, ⅛ inch linoleum sheets, plaster board of any one of several thicknesses and plaster ⅞ inch thick. Furthermore the rough openings in building walls are often neither perfectly rectangular nor plumb and the rough framing studs defining the opening, that is, the buck and header portions of the framing, are not necessarily straight, true and of exactly correct size.

It is, accordingly, an object of this invention to provide a pre-assembled casing which is and will remain true and rectangular; which may be easily arranged in plumb position in a building wall opening; which is then readily and securely fastenable in such plumb position; which adapts itself to walls of various thicknesses and compensates for irregularities of the wall portions adjacent the opening; which may be prefitted with trim strips; and which may, if desired, be prefitted with a door already hung properly in place therein.

A further object is to simplify the procedure necessary in mounting an adjustable door casing, or the like, in the rough opening of a building wall.

Another specific object is to increase the rigidity of mounting of a pre-assembled casing in a building wall opening.

While this invention pertains particularly to adjustable door casings, and while a door casing is specifically described herein, it will be apparent that the principles of this invention are applicable to window casings, outside door casings, and generally to casings for building wall openings, whether such openings are to be fitted with closure members or not. Furthermore, the casing is herein shown and described as being of wood. It will be apparent to those skilled in the art that metal or other materials may be substituted for wood throughout the casing, or in parts of the casing.

Figure 1:
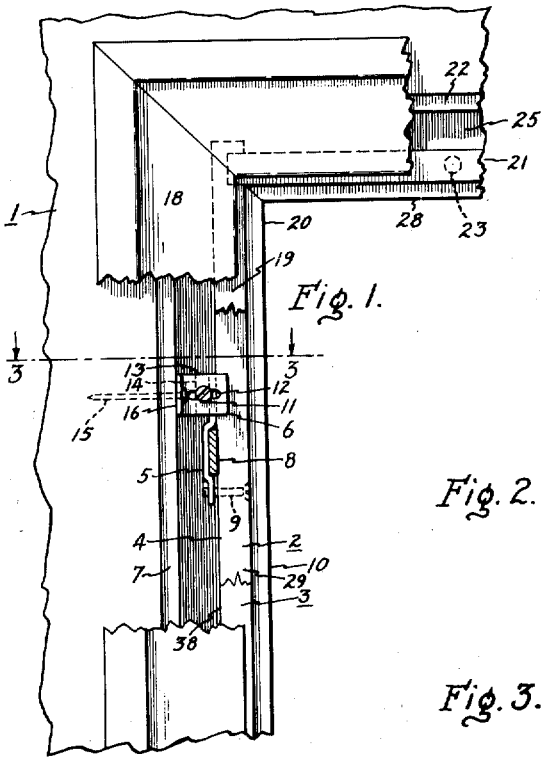
Figure 2:
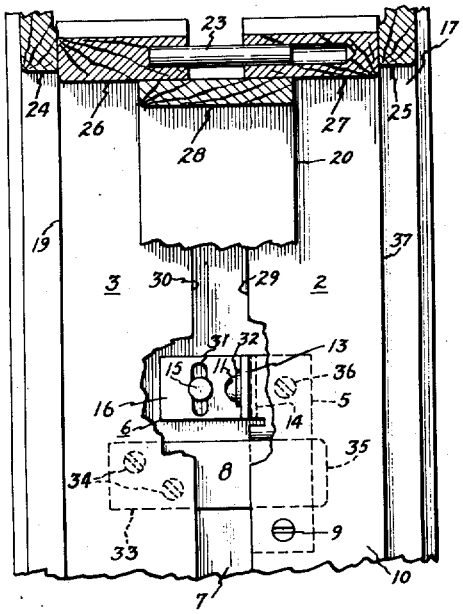
Figure 3:
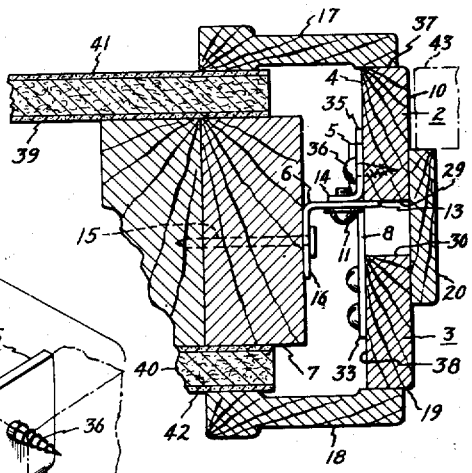
Figure 4:
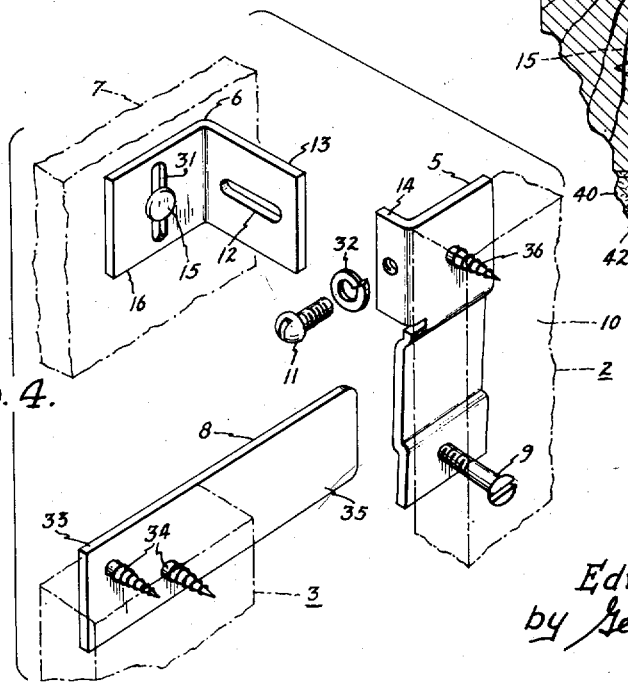
Figure 5:
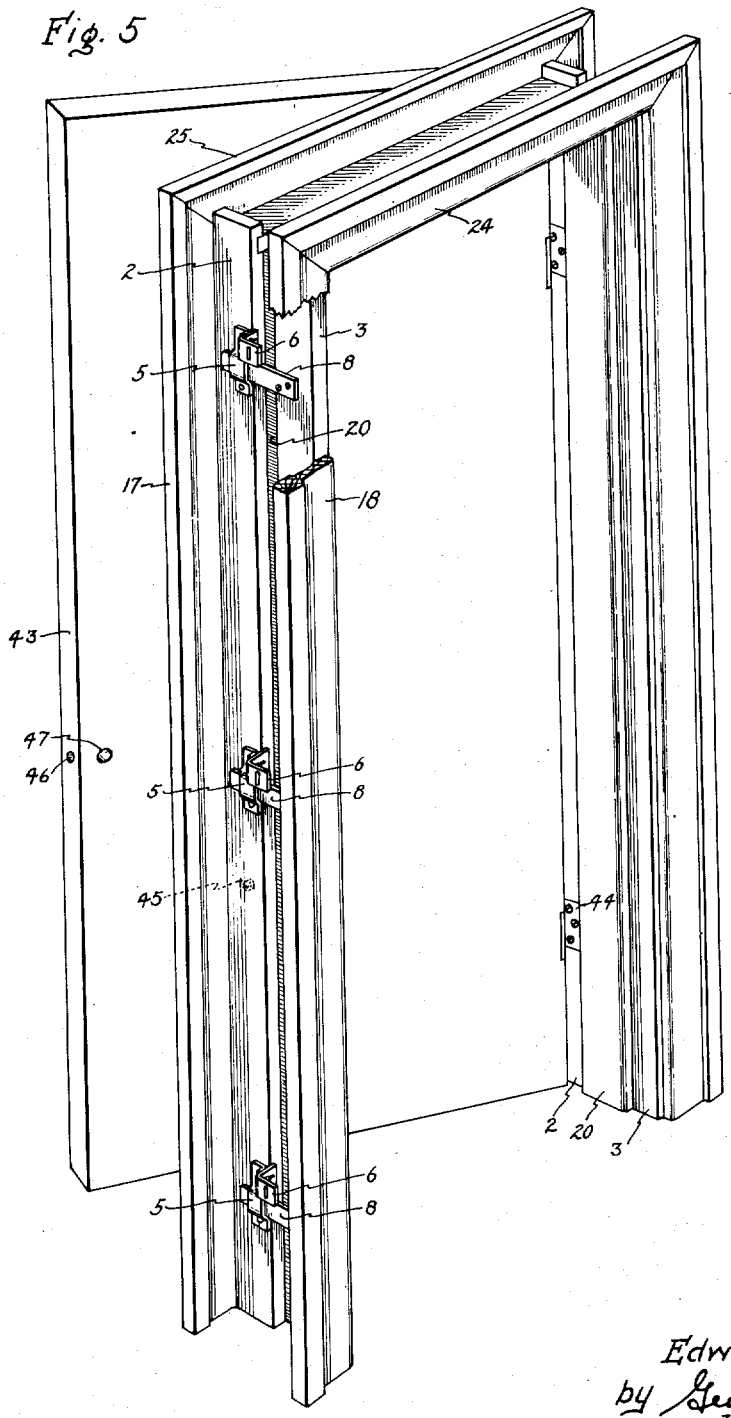
Figure 6:
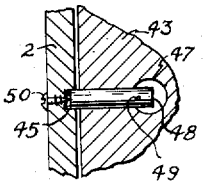

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing, in which Fig. 1 is a side elevational view of an upper corner of a door casing, partially broken away to show the attachment means fastening the casing to the door buck; Fig. 2 is a partial end view of the corner of Fig. 1, partially broken away and slightly enlarged to show certain details of the invention; Fig. 3 is a sectional view of the casing taken along line 3—3 of Fig. 1 and slightly enlarged; Fig. 4 is an exploded isometric view of the casing attachment devices according to this invention; Fig. 5 is a perspective view of a complete door casing as it may be manufactured and delivered to the building site; and Fig. 6 is an enlarged sectional view of a portion of a door and door casing showing details of a blocking arrangement which may be employed in shipping the casing of this invention.

Referring to Fig. 1, the casing is shown attached in place in a door opening in wall 1. The casing comprises two jamb members 2 and 3 extending vertically inside the rough opening. The hidden face 4 of jamb member 2 arranged toward the swing side of the opening carries metal plate 5 which is securely attached through a metal angle member or anchor 6 to the framing stud or door buck 7. Metal tenon 8 is shown clamped under plate 5 against the hidden face of jamb member 2. As later described, this tenon is attached at its base to the hidden face of jamb member 3, and when the tenon is clamped as shown in Fig. 1, the two members 2 and 3 of the split jamb are thereby securely attached one to the other. Clamping of the tenon 8 under plate 5 is accomplished by tightening a bolt 9, which has its head at the exposed surface 10 of jamb member 2 and which extends through this jamb member and threadedly engages an opening in plate 5. It will be noted that plate 5 is preferably sprung at its lower end slightly outwardly from the hidden face 4 of member 2. *A threaded attachment element in the form of bolt* [Bolt] 11 extends through a horizontal slot 12 in arm 13 of angle 6 and threads into an opening in an ear 14 of plate 5 to attach the angle to jamb member 2, and nail 15 extends through a vertical slot in arm 16 of angle 6 and into the studs which form the buck 7. Trim strips 17 and 18 are attached originally to the jamb members 2 and 3 along their outer edges, the outer edge 19 of jamb members 3 only being visible in Fig. 1. During installation, as later considered, the trim strips are nailed also to the wall or to the buck and header. A vertical door stop strip 20 is applied to the exposed faces of jamb members 2 and 3, as best seen in Figs. 2 and 3.

It will be understood that while only one anchor assembly, comprising plate 5, angle 6 and tenon 8, is seen in the view of Fig. 1, several such anchor assemblies are preferably provided along each vertical jamb, but two such assemblies for each jamb, or four for a complete casing, may be sufficient, and it will seldom be necessary to provide more than six for a complete casing, one at approximately the vertical center, one near the upper hinge level and one near the lower hinge level for each of the two jambs of a casing.

While one or more anchor assemblies may also be used to anchor the head pieces at 21 to the headers 22 of the rough opening, it has been found that such anchoring is not necessary, and it is, therefore, preferred in this invention to provide a dowel 23 to interconnect the two parallel head pieces, and to rely primarily upon trim members 24, 25 to provide the small amount of support appropriate to this portion of the casing. Trim members 24 and 25 are pre-attached to respective head pieces 26, 27, and are, upon mounting of the casing, nailed or similarly attached to the wall or header of the rough opening.

With reference to Fig. 2, it will be seen that dowel 23 fits into cylindrical cavities in head pieces 26, 27 to provide stiffness to the casing at this point. The rigidity may be further increased, and any tendency of the members 26, 27 to separate reduced, by setting the dowel ends with small nails driven upwardly through each head piece into the dowel. Door stop strip 28, however, is normally nailed in place with nails into each head piece, and, as heretofore explained, the trim strips 24, 25 are nailed to the respective wall surfaces which they overlie and provide substantial support.

Fig. 2 further illustrates the anchoring assembly for the vertical jamb members 2 and 3. Vertical door stop strip 20 is seen to partially overlie the exposed surfaces of the jamb members, and it completely covers the space left between the inner edges 29 and 30 of members 2 and 3, respectively. The stop member 20 and parts of the jamb members 2 and 3 are broken away to show the angle member 6, which is nailed by nail 15 through the vertical slot 31 of arm 16 to buck 7, and the head of bolt 11 and its underlying lock washer 32 which are provided to connect arm 13 of the angle members to ear 14 of plate 5. Also visible is a portion of tenon 8, which extends from a screw attachment at the base end 33 of the tenon to the hidden face of jamb member 3 across the space intervening between inner edges 29 and 30 of the jamb members. Wood screws 34 serve to attach the tenon base portion 33 to member 3. The extending end 35 of tenon 8 engages in a formed intermediate socket portion of plate 5 between wood screw 36 and bolt 9. Screw 36 holds the upper portion of plate 5 flat against the hidden surface of jamb member 2, while bolt 9, threadedly engaging in an opening in the lower portion, draws the lower portion closer to the jamb member and, when tightened, causes end 35 of the tenon to be securely clamped against the hidden surface of the member 2.

It is to be noted that door stop member 20 when applied will completely cover the head of bolt 9, as well as all other parts of the anchor assembly which would otherwise be visible from the exposed face side of the jamb members.

Fig. 2 further shows the positions occupied by trim strips 17 and 18 which are pre-attached to the outer edges 37 and 38, respectively, of jamb members 2 and 3.

Fig. 3 is an enlarged sectional view along line 3—3 of Fig. 1 and clearly discloses the positions of the several parts of a vertical jamb portion of a casing as applied to a wall edge defining a rough opening. The buck 7 may comprise two two-by-four studs or framing members disposed between plaster board panels 39 and 40. The exposed surfaces of these panels form wall surfaces 41 and 42, each of which is overlaid by a respective one of trim strips 17 and 18.

A door 43 may be hinged to jamb member 2 to swing into the space beyond wall surface 41, or the door may be hinged to the corresponding jamb member at the opposite side of the casing. The door is preferably hinged to a jamb member which is directly anchored through one or more angles 6 to a buck, rather than to a jamb member 3 which is connected to such angle through a tenon 8.

Fig. 4 discloses the details of the anchor assembly for attaching the casing to the door buck. The assembly comprises the angle 6 having a vertically slotted arm 16 nailed, by nail 15, to the door buck 7, and horizontally slotted arm 13 attachable by bolt 11 to ear 14 of plate 5. Lock washer 32 is provided under the head of bolt 11. Plate 5 is attached by wood screw 36 to the hidden face of jamb member 2, and the upper portion of the plate carrying the ear 14, lies flat against the hidden jamb face. *It will be noted that ear 14 is substantially flush with and is in effect an extension of the inner edge surface 29 of jamb member 2.* An offset and outwardly sprung intermediate portion forms a socket or clamping portion to receive the protruding end 35 of tenon 8, and bolt 9, of which the head is engaged against jamb member 2 at its exposed face, threads into a lower portion of the plate. This lower portion is also sprung slightly away from the hidden surface of the jamb member.

Turning bolt 9 toward the right draws the lower and intermediate portions of the plate 5 toward the jamb member, as though the intermediate socket portion of plate 5 were connected to the lower edge of the upper rigidly affixed portion along a fold line, as though by a stiff hinge. The stiff fold or hinge line may be partially weakened, if desired, as indicated in Fig. 4 by a small cut at one end of the fold line. Drawing-in the lower and intermediate socket portion, by rotation of the operating bolt 9, causes the intermediate portion to force the end 35 of tenon 8 against the hidden surface of the jamb member 2. The base portion 33 of the blade-like tenon member 8 is rigidly affixed against the hidden surface of jamb member 3. The tenon, accordingly, is mounted flush against the hidden surface of jamb member 3 and extends from this jamb member in alignment with its hidden face. When clamped in the socket of plate 5, the tenon is similarly aligned with the hidden face of jamb member 2. Since the jamb members are desirably equal in thickness, both the exposed and hidden faces are thus aligned into the same planes by the tenon.

This invention particularly contemplates the manufacture of complete door casings in a mill and shipment to the building site for rapid and easy mounting in place. A manufactured door casing ready for mounting is shown in Fig. 5. Door 43 is ready hung by hinges 44 to a jamb member 2 of the casing and trim strips 17 and 18 are firmly attached to the appropriate respective jamb members 2 and 3 and trim strips 24 and 25 are similarly attached to the head pieces as previously described. The door lock mechanism has been omitted, but suitable openings are pre-bored. Then anchor assemblies are normally provided at each side of the casing, as indicated for the lock side in Fig. 5. The door stop 20 only is loosely tacked in place at the factory and should be removed for mounting of the casing at the site. One or two priming coats of paint are preferably applied at the mill, and only a finish coat is necessary after installation.

The method of installation in the rough wall opening may be understood with particular reference to Fig. 5 and Fig. 3. When stop member 20 has been removed from the casing, and when the clamp bolt for each plate 5 is loosened, the casing comes apart into two major assemblies, one of which comprises jamb members 2, trim strips 17, 25, and the door 43, while the other comprises jamb members 3 and trim strips 18, 24.

The half comprising the jamb members 2 is first brought into proper position with trim strips 17 and 25 engaging the wall surface 41 around the opening and with the jambs properly plumb, or as nearly plumb as possible. The arms 16 of the angles 6 are now protruding beyond the inner edge of the jamb members 2 and the bolts 11 are readily accessible. The angles may be nailed to the buck, by nails 15, and then the ears 14 of the plates 5 adjusted along the angles and locked in desired adjusted positions by bolts 11, but, preferably, the angles 6 are adjusted on ears 14 to dispose the arms 16 of the angles against the buck before nailing the angles to the buck by nails 15. The trim strips 17 and 25 may be nailed to the walls at this time or after placement of the other half of the casing as desired.

After all of the angles 6 have been locked to their respective ears 14 by bolts 11 in properly selected adjusted positions and have been secured to the buck by nails 15, the other half of the casing is slipped into place, a tenon 8 engaging in the socket formed by each plate 5, and the dowel 23 sliding into the bore in head piece 27 as seen in Fig. 2. When the trim strips 18 and 24 are suitably seated against wall surface 42, the tenon locking bolts 9 are tightened to clamp the tenons 8 under plates 5. The whole casing is now securely in place. Installation is completed, however, by nailing the trim strips 18 and 24, and the trim strips 17 and 25 if these have not been previously nailed, to the wall, and by nailing the door stops 20 and 28 to the jamb members and head pieces. Nailing of the stop strips in place to members of both of the casing halves reinforces the installed casing. A finishing coat of paint may now be applied to the casing, including door 43, and the door lock mounted. It is sometimes desirable to mount the door lock prior to nailing in of the stop strips so that the strips can be more accurately positioned.

In order that the door 43 may be held during shipment of the casing, and to simplify the mounting of the lock hardware upon installation, a door bolt aperture 45 is bored into the exposed face of jamb member 2, and the lock bolt opening 46 and lock body opening 47 are bored in the door member 43. The openings are shown in Fig. 5 and will be seen therein to be available for the mounting of a lock and desired escutcheon plates and the like.

The detail sectional view of Fig. 6, however, taken through a portion of the door in closed position and through the adjacent portion of the jamb member 2, shows a reinforcing device or member in the form of a dowel rod 48 fitted in the lock bolt opening and extending at one end into the lock body opening 47 and at the other end into bolt aperture 45 in jamb member 2. An anchoring pin or nail 49 protrudes from dowel 48 within the lock body opening 47. Wood screw 50 enters the bottom of aperture 45 and aligns with and screws longitudinally into dowel 48. As screw 50 is turned into dowel 48, the dowel is drawn into aperture 45 until pin 49 engages the left-hand edge of lock body opening 47. As this condition is reached, since dowel 48 fits closely, though not bindingly, in aperture 45 and opening 46, the otherwise free vertical edge of the door is anchored firmly to the adjacent jamb member 2. This anchoring prevents swinging of the door on its hinges and prevents shifting of the door along jam member 2 opposite the hinges 44. The door thus becomes a very strong cross brace for the casing during shipment, holding the jamb members 2 against any forces tending to pull the jamb members apart at the bottom of the casing, and, more importantly, preventing the frame from being jarred out of rectangular shape even when subjected to accidental dropping on one of the corners of the casing. The results is that the upper joints of the casing are not loosened even with rough handling in shipment, and that the casing is rigidly held in its rectangular shape.

When it is desired to mount the casing in the building wall, the screw 50 is withdrawn and discarded and the dowel 48 is slid out of aperture 45 and further into the door, until the end of the dowel meets the back wall of opening 47, for example. The door may now be freely opened on its hinges. Pin, screw or nail 49 should be removed from the dowel 48 at this time, and the dowel is slipped out of lock bolt opening 46 and discarded.

It will be recognized that my invention as above described permits a door casing to be pre-assembled, including the affixing of the trim members to the jamb members, and, upon mounting in a building wall, to be anchored and braced directly against the faces of the buck at both sides without the use of wedges or shims. The mounting of the casing of my invention is rapidly accomplished with ease and accuracy, and the installation is completed without leaving exposed bolt heads or other fastening means. Since the jamb members to which the door is attached are firmly affixed at a predetermined adjusted distance from the face of the buck, the disadvantages of relying on the walls and trim strips for support are overcome, with a consequent greatly reduced tendency toward sagging of the door or cracking of plaster adjacent the casing. It is further apparent that the individual adjustment of each angle member permits positioning of the jamb members in substantially exactly vertical or plumb positions, even though the face of the buck toward the opening, against which face the angles are affixed, may be warped or not vertical.

While I have shown only certain preferred embodiments of my invention by way of illustration, many modifications will occur to those skilled in the art, and I therefore wish to have it understood that I intend, in the appended claims, to cover all such modification as fall within the true spirit and scope of my invention.

What I claim as new and desire to secure by Letters Patent of the United States is:

1. An attachment assembly for attaching a pair of jamb members of a split jamb or the like to a door buck or the like, said assembly comprising a plate for attachment against the hidden face of one said jamb member, a tenon for attachment against the hidden face of said other jamb member and having a portion protruding horizontally therefrom in alignment with said last face, said plate having a portion formed to receive and clamp said protruding portion of said tenon against said first hidden face and having an ear extending in a direction perpendicular to said first hidden face, an angle member having a first arm for attachment to said buck and a second arm to engage said ear, and adjustable attaching means connecting said second arm and ear in adjustble positions to dispose said first arm at selectable predetermined adjusted distances from said first face.

2. An attchment assembly for attaching a pair of jamb members of a split jamb or the like to a door buck or the like, said assembly comprising an elongated flat tenon having mounting holes adjacent one end and a blade-like portion at the other end, a tenon-clamping plate member having a body comprising an upper and lower portion and an intermediate portion formed to receive said blade-like portion of said tenon, an outwardly extending ear on one of said upper and lower portions of said plate member, an angle member having one arm for attachment to said buck and a perpendicular second arm adjustably attached to said ear to lock said one arm and said body at predetermined selected spaced positions, said one end of said tenon being attached against the hidden surface of one said jamb member, and said upper and lower portions of said plate body being attached at the hidden surface to the other of said jamb members.

3. An attachment assembly for attaching a split jamb door casing or the like to a door buck member or the like, said casing comprising two jamb members for aligned positioning adjacent said buck member, said assembly comprising a tenon device for attachment to a hidden face of one said jamb member, a tenon clamping device for attachment against a hidden face of said other jamb member, and an anchor member, locking means for locking said devices to each other in selected adjusted position, one of said devices comprising an ear, said anchor member having a portion for engaged attachment to said buck member and a spaced portion for adjustable engagement with said ear, and adjustable attachment means to lock said spaced portion, of said anchor member in predetermined selected position to said ear.

4. A pair of parallel vertical door jamb members for mounting to a door buck, said members having normally hidden faces adapted to be in alignment in a predetermined plane, a tenon extending between said members and having end portions respectively engaging said hidden faces, means affixing said tenon at one said end to the respective hidden face of one said member, a plate having a portion attached against the hidden face of the other said member adjacent the respective engaging end of said tenon and having an intermediate portion extending over said tenon and a terminal portion spaced from said last hidden face, force applying means connected to said terminal portion of said plate to urge said terminal portion and said intermediate portion toward said last hidden face to clamp said tenon to said last hidden face, an ear carried by said face-attached portion of said plate and extending in a direction perpendicular to the plane of said last hidden face, an angle member comprising an apertured buck-engaging arm and an arm engaging said ear, and adjustable attachment means to lock said last arm and ear in predetermined selected position.

5. A door casing comprising a pair of adjacent jamb sections, a tenon member attached to one of said sections and extending toward the other said section, a tenon-clamping member attached to said other section and comprising a tenon receiving socket, means to clamp a part of the extending portion of said tenon in said socket, an anchor element having a buck-engaging portion and a second portion extending therefrom, one of said members comprising an ear, and adjustable attachment means to lock said second portion of said anchor element to said ear, thereby to fix said buck-engaging portion in predetermined spaced relation to that jamb section to which said one member is attached.

6. A door casing comprising a pair of adjacent jamb sections, a tenon attached to one of said sections extending toward the other said section, a plate member attached to said other section and forming a socket to receive said tenon, means to clamp said tenon in said socket, an angle member attached to said plate in horizontally selectable position relative thereto and having a portion fastened to a buck at a portion of the surface of said buck spaced from said one section toward said other section.

7. A pre-assembled building wall opening closure casing comprising a first section for insertion from one side of said opening and a second section for subsequent insertion from the other side, said first section comprising a lining member having an inner edge, an outer edge, a hidden face and a parallel exposed face, a trim member fixed along said outer edge and extending therefrom substantially perpendicularly to said faces to hide said hidden face, a tenon locking plate comprising a first portion affixed in contact with said hidden face adjacent said inner edge, a second portion spaced from said hidden face and shaped to receive a tenon and a third portion spaced from said hidden face, means operable from said exposed face and connecting with said third portion to urge said second and third portions toward said hidden face, an ear affixed to said first portion extending in a direction perpendicular to the plane of said hidden face, an angle member having an arm engaging said ear and a second arm spaced from said hidden face and substantially parallel to said hidden face and protruding beyond said inner edge, adjustable attachment means operable from beyond said inner edge for attaching said first arm to said ear in selective adjustable position to dispose said second arm at a corresponding selected spaced position relative to said hidden face, said second arm being adapted for attachment to a member of said building wall bounding said opening, said second section comprising a second lining member for positioning in alignment with said first lining member with an inner edge toward said inner edge of said first lining member, and tenon means attached to said second lining member extending beyond its said inner edge and engageable for locking between said second portion of said plate and said hidden face.

8. A pre-assembled casing for a building wall opening, said opening being bounded by a framing member having a substantially vertical face toward said opening, said casing comprising first and second vertical jamb members for parallel aligned positioning spaced from and generally parallel to said face, an ear rigidly attached to said first jamb member and extending perpendicularly therefrom toward said face, an angle member having an arm for attachment against the face of said framing member, said first jamb member having an inner edge adjacent said ear and having an opposed outer edge, adjustable attachment means exposed for operation from beyond said inner edge to lock said angle member to said ear in selectable adjusted position with said arm extending away from said first jamb member beyond said inner edge thereof, said second jamb member having an inner edge to be disposed toward said inner edge of said first jamb member and an outer edge to be disposed away from said first jamb member, a trim strip pre-affixed along each said outer edge to overlie portions of the respective opposite surfaces of said wall adjacent said opening, said jamb members having respective hidden faces toward said face of said framing member, and locking means spanning between said inner edges to lock said jamb members one to the other in predetermined selected positions, said locking means comprising operating means extending through one said jamb member and exposed for operation at an exposed surface of said last jamb member and operated locking members disposed at hidden surfaces of said jamb members.

9. A pre-assembled casing for a building wall opening, said opening being bounded by a framing member having a substantially vertical face toward said opening, said casing comprising first and second vertical jamb members for parallel aligned positioning spaced from and generally parallel to said face, an ear rigidly attached to said first jamb member and extending perpendicularly therefrom toward said face, an angle member having an arm for attachment against the face of said framing member, said first jamb member having an inner edge adjacent said ear and having an opposed outer edge, adjustable attachment means exposed for operation from beyond said inner edge to lock said angle member to said ear in selectable adjusted position with said arm extending away from said first jamb member beyond said inner edge thereof, said second jamb member having an inner edge to be disposed toward said inner edge of said first jamb member and an outer edge to be disposed away from said first jamb member, a trim strip pre-affixed along each said outer edge to overlie portions of the respective opposite surfaces of said wall adjacent said opening, said jamb members having respective hidden faces toward said face of said framing member, a door hingedly mounted to said first jamb member, and locking means spanning between said inner edges to lock said jamb members one to the other in predetermined selected positions, said locking means comprising operating means extending through one said jamb member and exposed for operation at an exposed surface of said last jamb member and operated locking members disposed at hidden surfaces of said jamb members.

10. A pre-assembled casing for a building wall opening, said opening being bounded by a framing member having a substantially vertical face toward said opening, said casing comprising first and second vertical jamb members for parallel aligned positioning spaced from and generally parallel to said face, an ear rigidly attached to said first jamb member and extending perpendicularly therefrom toward said face, an angle member having an arm for attachment against the face of said framing member, said first jamb member having an inner edge adjacent said ear and having an opposed outer edge, adjustable attachment means exposed for operation from beyond said inner edge to lock said angle member to said ear in selectable adjusted position with said arm extending away from said first jamb member beyond said inner edge thereof, said second jamb member having an inner edge to be disposed toward said inner edge of said first jamb member and an outer edge to be disposed away from said first jamb member, a trim strip pre-affixed along each said outer edge to overlie portions of the respective opposite surfaces of said wall adjacent said opening, said jamb members having respective hidden faces toward said face of said framing member, a door hingedly mounted to said first jamb member, a tenon mounted to one of said jamb members and extending beyond the respective inner edge thereof in alignment with said hidden face of said one jamb member, and means for clamping an extending portion of said tenon against said hidden face of the other said jamb member, said means comprising a tenon clamping member and an actuating threaded member extending through said other jamb member adjacent said inner edge thereof.

11. A pair of parallel vertical door jamb members for mounting to a door buck, said members having normally hidden faces adapted to be in alignment in a predetermined plane, a tenon extending between said members and having end portions respectively engaging said hidden faces, means affixing said tenon at one said end to the respective hidden face of one said member, a plate having a first portion rigidly affixed against the hidden face of the other said member and a second portion comprising a tenon-receiving socket adapted to overlie the other said end portion of said tenon, said second portion being connected along a fold line to said first portion, force applying means engaging said second portion operative to force said second portion against said hidden face of said other member and thereby to clamp said tenon, an ear carried by said first portion, spacing means arranged for attachment to a door buck, and means adjustably to attach said spacing means to said ear.

*12. In a split jamb door frame structure comprising a pair of split jamb members, a rough buck adjacent said members having a vertical face disposed toward said members, the combination of one of said jamb members having at its inner edge an integral flat surfaced portion of which the flat surface is perpendicular to said buck face, an angle member having two flat arms perpendicular to one another, said angle member being disposed with one arm flat against said buck face and with the other arm extending outwardly from said face and lying flat against said flat surface at said inner edge of said jamb member, means rigidly affixing said one arm to said buck face, said other arm having a slot therein, and atachment means for fixing said other arm to said one jamb member comprising a threaded attachment element passing through said slot and connected to said jamb member, said element having a head engaging against said other arm.*

*13. The combination in accord with claim 12 wherein said one arm extends from its intersection with said other arm along said buck face in a direction away from said one jamb member, wherein said one arm has an opening therethrough, and wherein said means affixing said one arm to said buck face comprises a nail driven through said opening into said buck, said nail having a head engaging said one arm.*

*14. The combination in accord with claim 12 wherein said one arm has a slot therethrough and wherein said means affixing said one arm to said buck face comprises a nail driven through said slot of said one arm into said buck, said nail having a head engaging said one arm.*

*15. The combination in accord with claim 12 wherein said slot is elongated in a direction at an angle to said vertical buck face.*

*16. The combination in accord with claim 15 wherein said direction in which said slot is elongated is substantially a horizontal direction.*

*17. In combination, in a split jamb door casing structure comprising a pair of split jamb members and a rough buck, one of said members having an inner edge including an edge surface extending perpendicularly to the face of said buck, a metal angle member having two flat arms extending at right angles to one another, one said arm lying flat against said buck face, means attaching said one arm fixedly to said buck face, the other said arm extending perpendicularly outwardly from said buck face and lying flat against said edge surface, said other arm having a slot opening therethrough and oriented to extend in a direction away from the intersection of said arms and toward the outer end of said second arm, a threaded attachment element extending through said slot and connected to said one jamb member, said element having a head portion engaged against and forcing said other arm against said edge surface, thereby to fix said one jamb member at its said inner edge in adjustable spaced position with respect to said buck face.*

*18. The combination according to claim 17 wherein a tenon member connects between said jamb members to maintain said jamb members in alignment with each other.*

References Cited in the file of this patent or the original patent

UNITED STATES PATENTS

| | | |
|---|---|---|
| 1,855,470 | Bilton | Apr. 26, 1932 |
| 1,926,673 | Gregg | Sept. 12, 1933 |
| 2,185,650 | Shipway et al. | Jan. 2, 1940 |
| 2,489,029 | Guerrant | Nov. 29, 1949 |
| 2,608,276 | Kelly | Aug. 26, 1952 |